US009030787B2

(12) United States Patent
Takeda

(10) Patent No.: US 9,030,787 B2
(45) Date of Patent: May 12, 2015

(54) MOTOR PROTECTOR

(75) Inventor: Hideaki Takeda, Saitama (JP)

(73) Assignee: Uchiya Thermostat Co., Ltd. (JP)

( * ) Notice: Subject to any disclaimer, the term of this patent is extended or adjusted under 35 U.S.C. 154(b) by 0 days.

(21) Appl. No.: 14/125,479

(22) PCT Filed: May 17, 2012

(86) PCT No.: PCT/JP2012/062652
§ 371 (c)(1),
(2), (4) Date: Dec. 11, 2013

(87) PCT Pub. No.: WO2013/001931
PCT Pub. Date: Jan. 3, 2013

(65) Prior Publication Data

US 2014/0104730 A1 Apr. 17, 2014

(30) Foreign Application Priority Data

Jun. 28, 2011 (JP) ................................ 2011-142785

(51) Int. Cl.
*H02H 5/04* (2006.01)
*H02K 11/00* (2006.01)
*H01H 37/54* (2006.01)

(52) U.S. Cl.
CPC ....... *H02K 11/0047* (2013.01); *H01H 37/5418* (2013.01); *H01H 37/5427* (2013.01)

(58) Field of Classification Search
CPC . H02K 11/0047; H01H 37/54; H01H 7/0852; H01H 37/002; H01H 61/002
See application file for complete search history.

(56) References Cited

U.S. PATENT DOCUMENTS 4,866,227 A * 9/1989 Toguchi et al. ................. 218/26
5,367,279 A 11/1994 Sakai (Continued)

FOREIGN PATENT DOCUMENTS

CN 1744351 A 3/2006
JP 05-282977 A 10/1993

(Continued)

OTHER PUBLICATIONS

"International Application Serial No. PCT/JP2012/062652, International Search Report mailed Jun. 26, 2012", 2 pgs.

(Continued)

*Primary Examiner* — Shawki S Ismail
*Assistant Examiner* — Zoheb Imtiaz
(74) *Attorney, Agent, or Firm* — Schwegman Lundberg & Woessner, P.A.

(57) ABSTRACT

A motor protector of the present invention includes: a serial current path that is formed between a first terminal and a second terminal and that sequentially connects a fixed contact, the first terminal, a movable contact, a movable plate holding a bimetallic element, an intermediate fixing plate, a first electrode section, a first resistor, a second electrode section, and the second terminal, the fixed contact being held by a base member stored in an insulating resin case that includes an opening sealed by the sealing member; and a parallel current path that is formed between the first terminal and the intermediate fixing plate and that sequentially connects the first terminal, a conductive bottom plate, a second resistor (PTC) 19, and the intermediate fixing plate, wherein, after the first resistor produces heat due to an excessive current and the bimetallic element is thus thermally activated, thereby opening a contact, a current-interrupted state is also maintained because the high resistance of the PTC 19 maintains heat production.

6 Claims, 5 Drawing Sheets

CROSS SECTION F-F

CROSS SECTION E-E

(56) References Cited

U.S. PATENT DOCUMENTS

| | | | | |
|---|---|---|---|---|
| 6,396,381 | B1 * | 5/2002 | Takeda | 337/377 |
| 7,102,481 | B2 | 9/2006 | Stiekel | |
| 7,800,477 | B1 * | 9/2010 | Komer | 337/102 |
| 8,421,580 | B2 | 4/2013 | Takeda | |
| 8,519,816 | B2 | 8/2013 | Takeda | |
| 2005/0122205 | A1 | 6/2005 | Stiekel et al. | |
| 2009/0195205 | A1 * | 8/2009 | Ide | 318/490 |
| 2009/0213518 | A1 * | 8/2009 | Domejean et al. | 361/111 |
| 2010/0308954 | A1 | 12/2010 | Takeda | |
| 2011/0043321 | A1 | 2/2011 | Takeda | |
| 2013/0015944 | A1 | 1/2013 | Takeda | |
| 2013/0076480 | A1 | 3/2013 | Takeda | |

FOREIGN PATENT DOCUMENTS

| | | | |
|---|---|---|---|
| JP | 08-22757 | A | 1/1996 |
| JP | 10-144189 | A | 5/1998 |
| JP | 2005-174815 | A | 6/2005 |
| JP | 2005-176594 | A | 6/2005 |
| JP | 2006-149177 | A | 6/2006 |
| WO | WO-2009/095961 | A1 | 8/2009 |
| WO | WO-2009/125458 | A1 | 10/2009 |
| WO | WO-2013/001931 | A1 | 1/2013 |

OTHER PUBLICATIONS

“International Application Serial No. PCT/JP2012/062652, International Preliminary Report on Patentability dated Jan. 7, 2014”, (w/ English Translation), 8 pgs.

“International Application Serial No. PCT/JP2012/062652, Written Opinion mailed Jun. 26, 2012”, (w/ English Translation), 6 pgs.

* cited by examiner

CROSS SECTION F-F

CROSS SECTION E-E

MOTOR PROTECTOR

RELATED APPLICATIONS

This application is a U.S. National Stage Filing under 35 U.S.C. §371 of International Application No. PCT/JP2012/062652, filed on May 17, 2012, and published as WO 2013/001931 A1 on Jan. 3, 2013, which claims priority to Japanese Application No. 2011-142785, filed Jun. 28, 2011, which applications and publications are incorporated herein by reference in their entirety.

FIELD

The present invention relates to a motor protector that is operated in response to an excessive mechanical load so as to interrupt a current circuit of a motor of an electric appliance, and that maintains the interrupting operation.

BACKGROUND

Conventionally, the rotation of electric appliances that use a motor as a driving force, and, in particular, the rotation of appliances such as home-use food crushing mixers, have been able to be mechanically overloaded depending on the kind and amount of food put in the appliance, and a greater load could stop the rotation of the food crushing mixers.

Such a great mechanical load increases a current flowing through a current circuit that rotates the motor. In addition, an excessive load decreases the rotation speed of the motor remarkably or stops the rotation of the motor. Such a remarkable decease in the motor rotation speed or the stopping of the motor increases the current, thereby damaging the motor due to, for example, a short circuit of a coil of the motor or burning and cutting of the coil.

A protector is known that senses excessive heat produced by a motor or an excessively increased current flowing through a motor driving circuit and that immediately interrupts the current flowing through the motor driving circuit in order to prevent the aforementioned malfunction and protect the motor.

As such a protector, a motor protecting apparatus has been proposed that includes a built-in exothermic resistor in series with a contact circuit, that operates a bimetallic element in response to heat production from the resistor caused by an excessive current, and that opens the contact circuit so as to interrupt the current (e.g., patent documents 1 to 3).

In the meantime, to interrupt a circuit through which an overload current is flowing, a motor protecting apparatus understandably needs to start an interrupting operation in a short time; in addition, once the interrupting operation starts, it is required for safety that the conductive state not be achieved again until the power is turned off after the fault is eliminated, i.e., until a certain operation is performed by a person.

However, in a resistor arranged in series with a contact circuit, repetitive operations of energization and interruption occur due to an automatic restoration resulting from a temperature decrease after current interruption. Although the motor may be prevented from being suddenly damaged, the repetitive operations of energization and interruption has a defect in, for example, that it is unclear whether or not the appliance is being operated.

To prevent such repetitive operations, a protector is proposed that includes a built-in positive-characteristic thermal resistor in parallel with a contact circuit, wherein the protector self-holds an interrupting-operation state by maintaining a current interrupting operation with a bimetallic element by making use of the heat produced by the resistor (see, for example, patent document 4).

PRIOR ART DOCUMENTS

Patent Documents

Patent document 1: Japanese Laid-open Patent Publication No. 2005-176594

Patent document 2: Japanese Laid-open Patent Publication No. 08-022757

Patent document 3: Japanese Laid-open Patent Publication No. 10-144189

Patent document 4: Japanese Laid-open Patent Publication No. 05-282977

SUMMARY

Problems to be Solved by the Invention

However, the technology described in patent document is provided with the two bimetallic elements, a main bimetallic element and a sub bimetallic element, wherein a heating resistor unit serially connected to a contact circuit is connected in parallel to the contact circuit in response to an operation of the sub bimetallic element, and the main bimetallic element maintains an operation to interrupt the contact circuit by making use of heat produced by the heating resistor unit.

In addition to a problem of an increase in cost resulting from the use of two bimetallic elements, there is a problem of a complicated mechanism for switching from a serial connection of the heating resistor unit to the contact circuit to a parallel connection.

Means for Solving the Problems

The present invention solves the aforementioned conventional problems, and an object thereof is to provide a motor protector that is operated in response to an excessive mechanical load so as to continue interruption of a current that would flow through a motor.

To solve the aforementioned problems, a motor protector in accordance with the present invention is configured to put, in an open state, an electric contact of a conduction circuit for an electric appliance when the temperature of the electric appliance exceeds a predetermined temperature, the motor protector being provided with: an insulating resin case that includes an opening sealed by a sealing member; a base member stored in the insulating resin case; and a component held by or integrally incorporated into the base member, the motor protector including a serial current path composed of: a fixed contact; a first terminal one end of which is connected to the fixed contact; a movable plate that includes a movable contact at an end facing the fixed contact, the movable plate holding a bimetallic element at a surface opposite to the surface at which the movable contact is provided; a conductive intermediate fixing plate that fixedly holds an end opposite to the end provided with the movable contact of the movable plate; a first electrode section formed at one side of an opposite end that is opposite to the end of the intermediate fixing plate at which the movable plate is fixedly held; a first resistor one end of which is connected to the first electrode section; a second electrode section connected to another end of the first resistor, insulated from the intermediate fixing plate, and located at a position corresponding to another side of the opposite end of the intermediate fixing plate; and a second terminal one end of which is connected to the second electrode section, the serial current path being connected between the first and second terminals, the motor protector further including: a second resistor one end of which is connected to the first terminal via a conductive bottom plate, the second resistor being connected to the movable contact via the movable plate and the intermediate fixing plate and being connected in parallel to the serial current path, wherein the movable plate includes a long hole formed at a central portion along the longer direction, and wherein the first resistor is arranged in a manner such that the longer direction extends in a direction orthogonal to a direction in which electricity flows through the movable plate, the first resistor is connected in a manner such that the two ends of the longer direction form a bridge between the first and second electrode sections, and the first resistor is arranged in a manner such that an intermediate portion of the longer direction is inserted into a gap formed between the second resistor and an inside position with respect to a portion at which the movable contact of the movable plate is formed and such that the intermediate portion of the longer direction faces the bimetallic element via the long hole of the movable plate.

The first resistor is formed of, for example, a thin metallic-material plate having a high specific resistance in comparison with the first and second terminals, copper, and iron.

The second resistor, which is, for example, a PTC (positive temperature coefficient) element, is configured in a manner such that one half or greater of an upper electrode surface is in direct contact with the intermediate fixing plate, such that a gap in which a central portion of the first resistor is inserted is formed between a top surface of the remaining portion and an inside position with respect to a portion at which the movable contact of the movable plate is formed, and such that a lower electrode surface is connected to the conductive bottom plate.

For example, the motor protector is configured in a manner such that the movable plate includes pegs formed at the two ends of a shorter direction and hooks formed at the two ends of the longer direction of the long hole, wherein two longer-direction ends of the bimetallic element loosely engage with the hooks of the movable plate; the positions of two shorter-direction ends of the bimetallic element are controlled by the pegs of the movable plate so as to be held by the movable plate; at a predetermined temperature or lower, the bimetallic element is held by the movable plate in a shape that is similar to the shape of the movable plate that causes the movable contact to abut the fixed contact; and, at a temperature higher than the predetermined temperature, the warpage in the longer direction is reversed to lift the end of the movable plate at which the movable contact is provided, thereby separating the movable contact and the fixed contact from each other.

The conductive bottom plate and the intermediate fixing member that form the current path are preferably formed of a ferromagnetic substance and are preferably attached by, for example, a member that does not form the current path so as to surround an upper position and a side-surface position of the movable contact, and the member is preferably formed of a ferromagnetic substance.

Other ends of the first and second terminals are drawn to the outside by the base member and connected to one end of a lead wire so as to be buried in the sealing member, and another end of the lead wire pierces through the sealing member so as to be drawn out of the insulating resin case.

Effect of the Invention

In the motor protector of the present invention, a first resistor and movable plates that are two thin plate members typically formed of metal thin plates are arranged in a manner such that a current path of the first resistor and a current path of the movable plates are orthogonal to each other. This achieves the advantage of stabilizing the circuit by minimizing the influence of an electrical electromagnetic force that would oscillate the thin plates since currents flowing in the same direction generate forces that resist each other or currents flowing in the opposite directions generate forces that attract each other if the current paths are parallel to each other.

A resinous member is inevitably selected as the base member located within the insulating resin case in terms of processability. Meanwhile, the first resistor composed of a metal thin plate inevitably melts when a heavy current flows. However, a melted central portion of the first resistor is inserted into a gap between the metal movable plate and the electrode surface of the PTC element of electronic ceramic, and hence the portion that has become a free end due to the melting stays in the insertion region. This achieves the advantage of safely interrupting the circuit without adversely affecting the base member even in the event of melting.

A third resistor is obtained by reducing the electric-conduction area of the movable plate by providing a long hole at the central portion of the movable plate along the longer direction, thereby achieving the advantage that the movable plate to which a bimetallic element is directly attached produces heat in response to a heavy current and the advantage that the bimetallic element takes a shorter time to open the contact since the radiation and the convection of heat produced by the first resistor, which also produces heat in response to a heavy current, directly propagate to the bimetallic element through the long hole of the movable plate.

A ferromagnetic substance surrounds an area in the vicinity of the contact parts and surrounds the contact parts themselves so as to minimize the influence from an external magnetic field, thereby preventing the disadvantage that the arc generated between the contacts is scattered on a portion different from the contacts due to the influence from the external magnetic field.

PREFERRED EMBODIMENTS

Figure 1A:
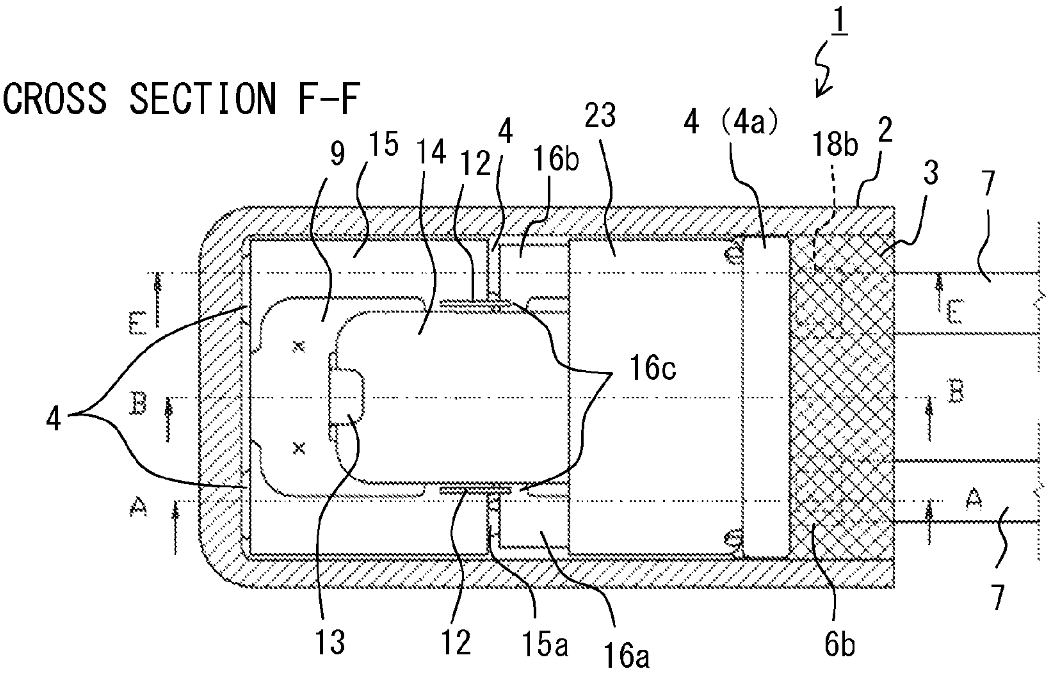
FIG. 1A is a plan cross-sectional view of a motor protector in accordance with embodiment 1 of the present invention and is also an F-F line cross-sectional view of FIG. 1B.

In the following, embodiments of the present invention will be described in detail with reference to FIG. 1 to FIG. 5.

Embodiment 1

As illustrated in FIG. 1A, FIG. 1B, FIG. 2A, and FIG. 2B, a motor protector 1 in accordance with embodiment 1 of the present invention includes an insulating resin case 2 that includes an opening sealed by a sealing member 3. Components held by or integrally incorporated in a base member 4 are stored in the insulating resin case 2 together with the base member 4. A resin material is used as the base member 4 in view of ease of molding. The components stored in the insulating resin case 2 together with the base member 4 are configured as follows.

Figure 2A:
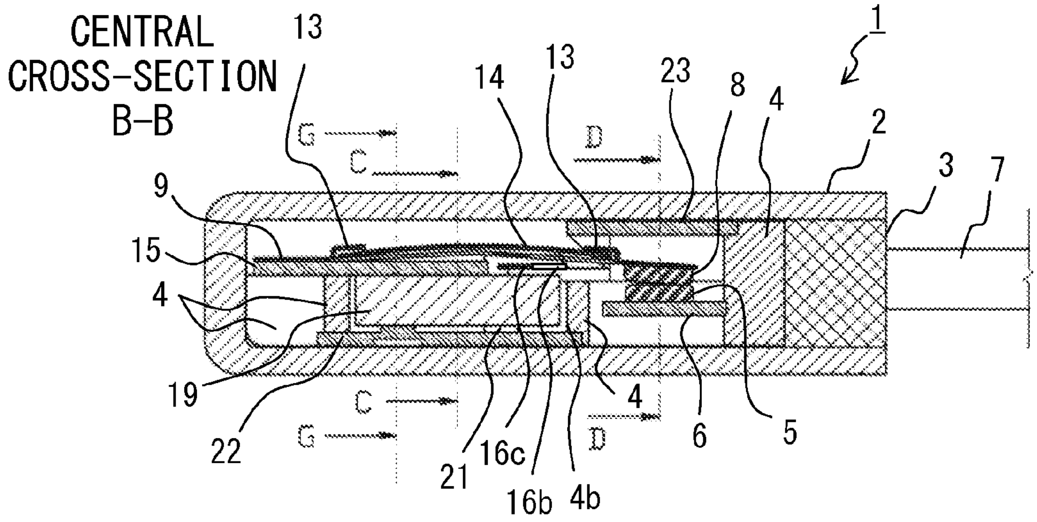
FIG. 2A is a B-B line cross-sectional view of FIG. 1A.
Figure 3A:
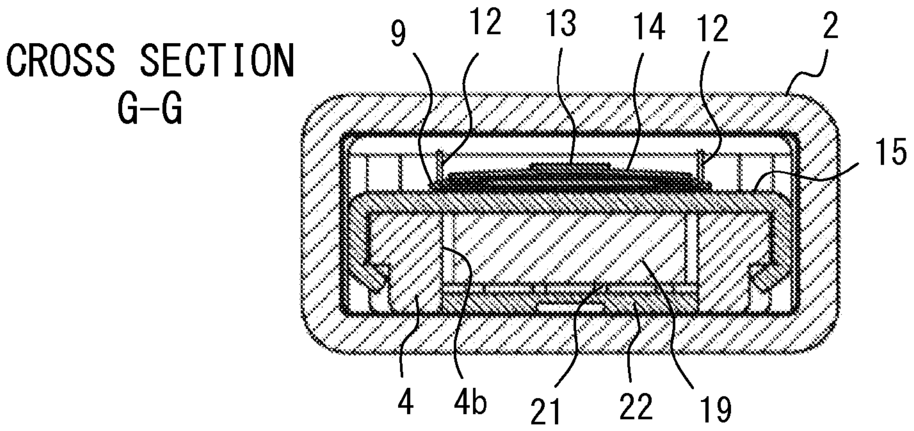
FIG. 3A is a G-G line cross-sectional view of FIG. 1B, FIG. 2A, and FIG. 2B.
Figure 3B:
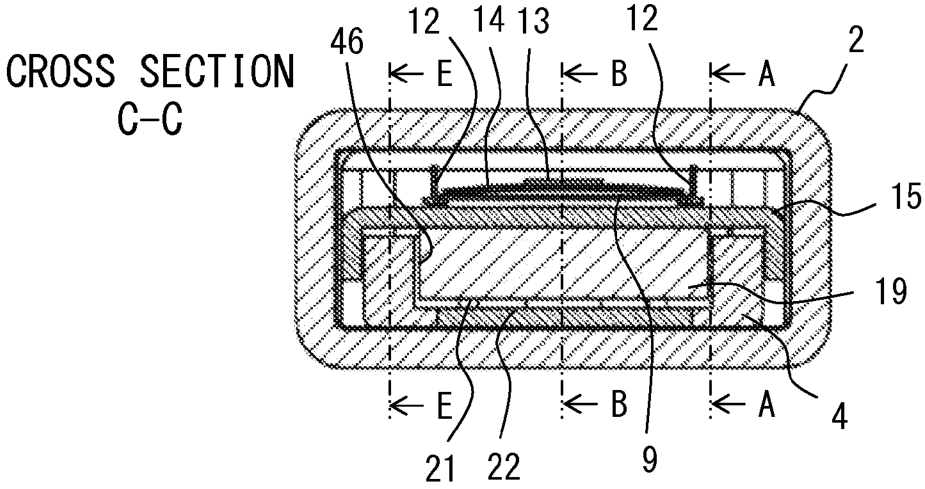
FIG. 3B is a C-C line cross-sectional view of FIG. 1B, FIG. 2A, and FIG. 2B.
Figure 3C:
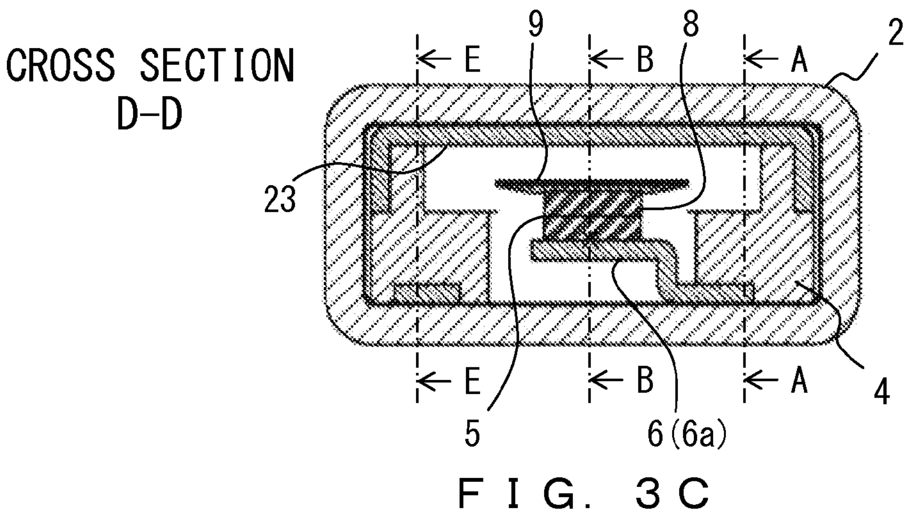
FIG. 3C is a D-D line cross-sectional view of FIG. 1B, FIG. 2A, and FIG. 2B.

A fixed contact 5 and a first terminal 6 that includes one end 6*a* connected to the fixed contact 5 are provided as illustrated in FIG. 2A and FIG. 3C. The first terminal 6 is vertically bent down at a position of the near side of the drawing depth direction of FIG. 2A relative to the fixed contact 5 (the right side in FIG. 3C), and is horizontally bent at a position in contact with the bottom of the insulating resin case 2 toward the near side of the drawing depth direction of FIG. 2A (the right direction in FIG. 3C), and the first terminal 6 extends under the bottom of the base member 4.

Figure 2B:
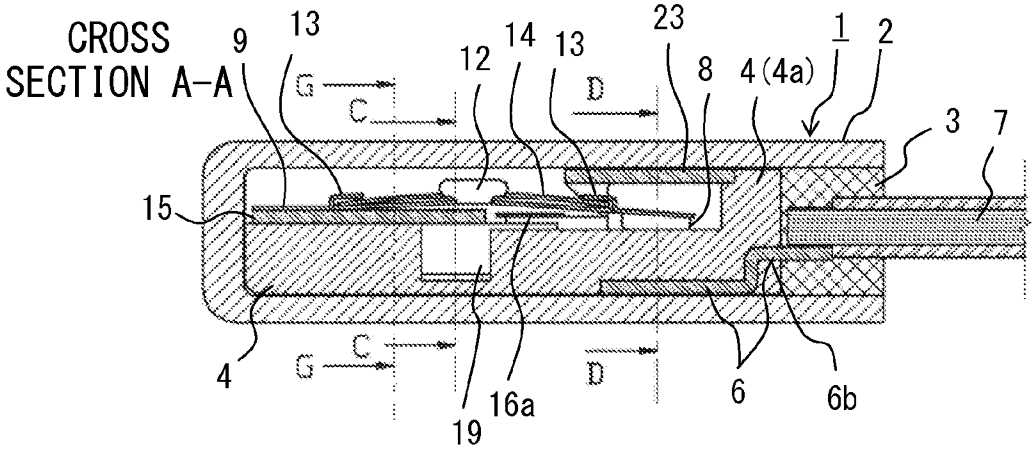
FIG. 2B is an A-A line cross-sectional view of FIG. 1A.

The first terminal 6 extending under the bottom of the base member 4 further becomes another end 6*b* relative to the one end 6*a* and is vertically bent while remaining horizontal, and the first terminal 6 extends to the far side of the drawing depth direction of FIG. 3C (the right direction in FIG. 2B). As illustrated in FIG. 2B, the first terminal 6 reaches a bottom of a front stand part 4*a* of the base member 4, stands upright, and is soon horizontally bent again. As illustrated in FIG. 1A and FIG. 2B, the first terminal 6 extends outside from the front stand part 4*a*, and the first terminal 6 is connected to an end of a lead wire 7 and is buried in the sealing member 3 together with the end of the lead wire 7.

Figure 4:
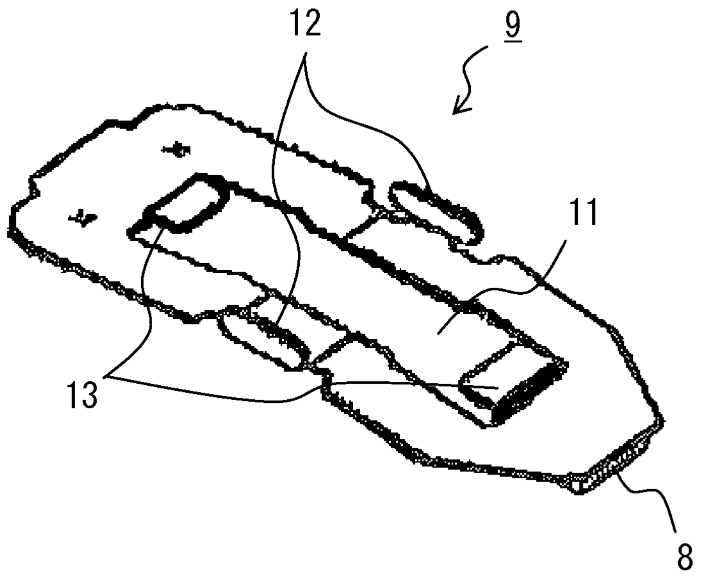
FIG. 4 is a perspective view illustrating a shape of a movable plate of the motor protector in accordance with embodiment 1.

Next, as illustrated in FIG. 2A and FIG. 3C, a movable plate 9 is provided that includes a movable contact 8 at an end facing the fixed contact 5. As illustrated in FIG. 4, a long hole 11 is formed at a central portion of the movable plate 9 along a longer direction.

As illustrated in FIG. 1A, FIG. 2A, FIG. 2B, FIG. 3A, and FIG. 3B, the movable plate 9 includes, at a surface opposite to a surface at which the movable contact 8 is provided, pegs 12 at two ends of a shorter direction and hooks 13 at two ends of a longer direction of the long hole 11.

As illustrated in FIG. 1A, FIG. 2A, FIG. 2B, FIG. 3A, and FIG. 3B, the movable plate 9 holds a bimetallic element 14 at a surface opposite to a surface at which the movable contact 8 is provided. Two longer-direction ends of the bimetallic element 14 loosely engage with the hooks 13 of the movable plate 9, and the positions of two shorter-direction ends of the bimetallic element 14 are controlled by the pegs 12 of the movable plate 9 so as to be held by the movable plate 9.

Figure 1B:
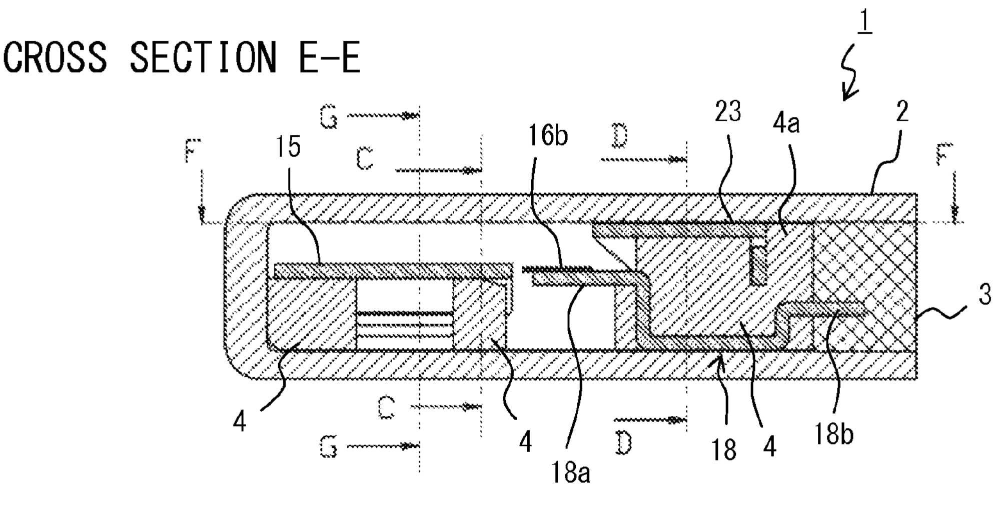
FIG. 1B is a sectional side view of a motor protector in accordance with embodiment 1 of the present invention and is also an E-E line cross-sectional view of FIG. 1A.

As illustrated in FIG. 1A, FIG. 2A, and FIG. 2B, the movable plate 9 is configured in a manner such that an end opposite to the end with the movable contact 8 is fixedly held by a conductive intermediate fixing plate 15. The intermediate fixing plate 15 is formed of a ferromagnetic substance and is arranged to cover about one half of a top surface at the back of the base member 4 as illustrated in FIG. 1A and FIG. 1B, and, as illustrated in FIG. 3A and FIG. 3B, the conductive intermediate fixing plate 15 includes sides extending downward over the two side surfaces of the base member 4 so as to be fixed to the base member 4.

Accordingly, an end opposite to the end with the movable contact 8 of the movable plate 9 illustrated in FIG. 1A, FIG. 2A, and FIG. 2B is fixed to the base member 4 via the intermediate fixing plate 15. The movable plate 9 forms a current path in a longer direction from the end with the movable contact 8 to the end fixed to the intermediate fixing plate 15.

At the end opposite to the end fixedly holding the movable plate 9 of the intermediate fixing plate 15, i.e., at a position to the right of a forward end facing the direction of the sealing member 3, as illustrated in FIG. 1A, a tongue piece 15*a* that includes a step below the top surface extends forward to form a first electrode section 15*a* (hereinafter indicated using the same reference code as the tongue piece).

FIG. 2B is an A-A line cross-sectional view of FIG. 1, and hence the tongue piece (first electrode section) 15*a* is located on near side of the drawing depth direction and is thus not seen in FIG. 2B.

One end 16*a* of a first resistor 16 is connected to the first electrode section 15*a*. The first resistor 16 is a thin plate composed of a metal piece shaped like a "rectangle with one side removed". The metal piece is a metal with a high specific resistance in comparison with, for example, copper, iron, and a terminal used in the current circuit. As an example, a stainless thin plate may be used.

At a side opposite to the side of the base member 4 at which the first electrode section 15*a* is located, a second electrode section 17 is located in a manner such that the second electrode section 17 is spaced away from the intermediate fixing plate 15, i.e., insulated from the intermediate fixing plate 15. Another end 16*b* of the first resistor 16 is connected to the top surface of the second electrode section 17, and one end 18*a* of a second terminal 18 is connected to the under surface of the second electrode section 17.

As illustrated in FIG. 1B, the second terminal 18 horizontally extends in an opening direction within the insulating resin case 2, and the second terminal 18 extends below the base member 4 and is immediately vertically bent down. The second terminal 18 extends to the bottom of the insulating resin case 2 and is again horizontally bent. The second terminal 18 extends to the bottom of the front stand part 4*a* and then stands upright, and the second terminal 18 horizontally extends again, becomes another end 18*b* relative to the one end 18*a*, and extends from the front stand part 4*a* to the outside. As illustrated in FIG. 1A, the second terminal 18 is connected to an end of another lead wire 7 and is buried in the sealing member 3 together with this other lead wire 7.

Figure 5:
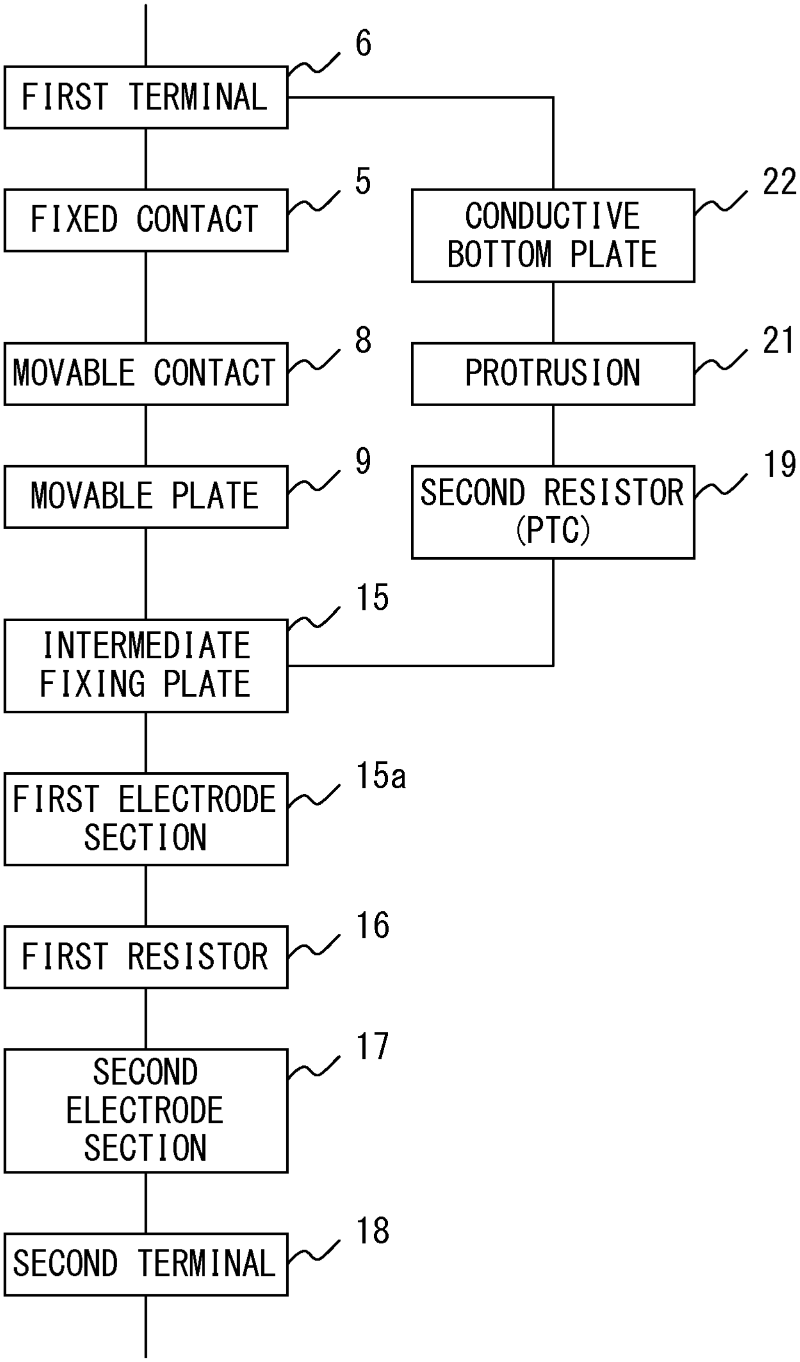
FIG. 5 is a block diagram illustrating a relationship of connection between a serial current path and a parallel current path of the motor protector in accordance with embodiment 1.

As illustrated in FIG. 5, connecting the aforementioned components forms within the insulating resin case 2 a serial current path composed of the first terminal 6, the fixed contact 5, the movable contact 8, the movable plate 9, the intermediate fixing plate 15, the first electrode section 15*a*, the first resistor 16, the second electrode section 17, and the second terminal 18.

As described above, the one end 16*a* of the first resistor 16 is connected to the first electrode section 15*a*, and the other end 16*b* of the first resistor 16 is connected to the second electrode section 17. The first resistor 16 forms a bridge between the first electrode section 15*a* and the second electrode section 17. As illustrated in FIG. 1A, the first resistor 16 is arranged in a manner such that a longer direction that includes a central portion 16*c* is orthogonal to a longer direction of the movable plate 9, i.e., a direction in which electricity flows.

As described above, the first resistor 16 and the movable plate 9, i.e., a thin-plate metal member, are arranged in a manner such that current paths thereof are orthogonal to each other. This orthogonality arrangement may stabilize the current by minimizing a malfunction such as an oscillation that would be caused by forces that resist each other or forces that draw each other if the current paths are parallel to each other.

As illustrated in FIG. 1A and FIG. 2A, the first resistor 16 faces the bimetallic element 14 via the long hole 11 of the movable plate 9 illustrated in FIG. 4.

Accordingly, in addition to heat being produced in response to a heavy current by the movable plate 9 to which the bimetallic element 14 is directly attached, the radiation and the convection of heat produced by the first resistor 16, which also produces heat in response to a heavy current, directly propagate to the bimetallic element 14 through the long hole 11 of the movable plate 9, so that the time required by the bimetallic element 14 to open the contact can be shortened.

In the meantime, a member to form a parallel current path is incorporated in the serial current path. That is, as illustrated in FIG. 2A, FIG. 2B, FIG. 3A, and FIG. 3B, a second resistor 19 is provided in a recess 4*b* formed at a substantially central portion of the base member 4.

At temperatures lower than a predetermined temperature, the second resistor 19, which is a PTC (positive temperature coefficient) element, achieves low electrical resistance and thus smoothly conducts electricity; at temperatures higher than the predetermined temperature, the second resistor 19 achieves high electrical resistance and thus produces heat.

The second resistor 19 includes a top-surface electrode abutting the intermediate fixing plate 15 and an under-surface electrode connected to a conductive bottom plate 22 via a plurality of protrusions 21. The conductive bottom plate 22 is formed of a ferromagnetic substance and is connected to the first terminal 6.

Consequently, in comparison with the aforementioned serial current path from the first terminal 6 to the second terminal 18, a parallel circuit of the conductive bottom plate 22, the protrusions 21, and the second resistor 19 is formed that is in parallel with the current path composed of the first terminal 6, the fixed contact 5, the movable contact 8, the movable plate 9, and the intermediate fixing plate 15, as illustrated in FIG. 5.

A current from a driver wire to drive a motor (not illustrated) connected to the two lead wires 7 of the motor protector 1 flows through the serial current path and the parallel current path illustrated in FIG. 5 between the first terminal 6 and the second terminal 18.

When the current becomes excessively high due to, for example, overloading of a motor, the movable plate 9 and the first resistor 16 produce heat in response to the excessive current. Heat produced by the movable plate 9 and the first resistor 16 radiates through the bimetallic element 14 and the second resistor 19. The heat increases an value of resistance of the second resistor 19, and, in accordance with the increased value of resistance, the second resistor 19 itself also produces heat that further increases the value of resistance.

In the serial current path and the parallel current path, at a predetermined temperature or lower, the bimetallic element 14 is held by the movable plate 9 in a shape that is similar to the shape of the movable plate 9 that causes the movable contact 8 to abut the fixed contact 5.

At temperatures higher than the predetermined temperature, the warpage in the longer direction is reversed to lift the end of the movable plate 9 at which the movable contact 8 is provided, thereby separating the movable contact 8 and the fixed contact 5 from each other.

The predetermined temperature is the temperature of the resistance heat within the insulating resin case 2 generated by the movable plate 9, the first resistor 16, and the second resistor 19 in response to an overcurrent (a heavy current) flowing through the circuit illustrated in FIG. 5 in association with the overload of the motor (not illustrated) to be protected by the motor protector 1.

The bimetallic element 14 is thermally activated by a temperature generated by the overcurrent, thereby separating the movable contact 8 and the fixed contact 5 from each other, with the result that the current is interrupted.

The interrupted current resulting from the separating of the movable contact 8 and the fixed contact 5 from each other flows through the conductive bottom plate 22, the protrusions 21, and the second resistor 19 on the parallel-circuit-side. The heat within the insulating resin case 2, in which the bimetallic element 14 has been thermally activated, has already increased the electrical resistance of the second resistor 19.

A heavy current is inclined to flow through the second resistor 19, and hence the second resistor 19 produces heat, thereby further increasing the electrical resistance, with the result that the current substantially stops. In this way, after interrupting the current through the current circuit, the motor protector 1 of this example may continue the interrupting operation.

An excessively heavy current generated by an overload melts the central portion 16*c* of the first resistor 16. Consequently, the current is completely interrupted before the bimetallic element 14 is thermally activated.

As illustrated in FIG. 2A, the first resistor 16 is arranged in a manner such that the central portion 16*c* of the longer direction is inserted into a gap formed between the second resistor 19 and an inside position with respect to a portion at which the movable contact 8 of the movable plate 9 is formed.

The portion that has become a free end due to the melting stays in the insertion region. Accordingly, even in the unlike event that the first resistor 16 is melted, the resin-material base member 4 is not touched and is thus not adversely affected.

That is, the circuit may be safely interrupted without damaging the other internal components. Accordingly, by replacing only the first resistor 16 after melting, the motor protector 1 may be recycled and reused.

As illustrated in FIG. 1A, FIG. 1B, FIG. 2A, FIG. 2B, and FIG. 3C, in the motor protector 1 of this example, an upper position and a side-surface direction of the contact part of the movable contact 8 and the fixed contact 5 are surrounded by a ferromagnetic member 23, which is formed of a member that does not form the current path. In addition, as described above, the intermediate fixing plate 15 and the conductive bottom plate 22 that form the current path are also formed of a ferromagnetic substance.

As described above, a ferromagnetic substance surrounds an area in the vicinity of the contact parts and the contact parts themselves so as to minimize the influence from an external magnetic field, thereby preventing the disadvantage that the arc generated between the contacts is scattered on a portion different from the contacts due to the influence from the external magnetic field.

INDUSTRIAL APPLICABILITY

The present invention is applicable to a motor protector that is operated in response to an excessive mechanical load so as to maintain interruption of a current that would flow through a motor.

EXPLANATION OF THE CODES

1 Motor protector
2 Insulating resin case

3 Sealing member
4 Base member
4*a* Front stand part
4*b* Recess
5 Fixed contact
6 First terminal
6*a* One end
6*b* Another end
7 Lead wire
8 Movable contact
9 Movable plate
11 Long hole
12 Peg
13 Hook
14 Bimetallic element
15 Intermediate fixing plate
15*a* Tongue piece (First electrode section)
16 First resistor
16*a* One end
16*b* Another end
16*c* Central portion
17 Second electrode section
18 Second terminal
18*a* One end
18*b* Another end
19 Second resistor
21 Protrusion
22 Conductive bottom plate

The invention claimed is:

1. A motor protector that puts, in an open state, an electric contact of a conduction circuit for an electric appliance when a temperature of the electric appliance exceeds a predetermined temperature, the motor protector being provided with an insulating resin case including an opening sealed by a sealing member, a base member stored in the insulating resin case, and components held by or integrally incorporated in the base member, the motor protector comprising:

a serial current path that includes a fixed contact, a movable plate including a first terminal one end of which is connected to the fixed contact and a movable contact at an end facing the fixed contact, the movable plate holding a bimetallic element at a surface opposite to a surface at which the movable contact is provided, a conductive intermediate fixing plate fixedly holding an end opposite to the end with the movable contact of the movable plate, a first electrode section formed at one side of an opposite end that is opposite to an end of the intermediate fixing plate at which the movable plate is fixedly held, a first resistor one end of which is connected to the first electrode section, a second electrode section connected to another end of the first resistor, insulated from the intermediate fixing plate, and located at a position corresponding to another side of the opposite end of the intermediate fixing plate, and a second terminal one end of which is connected to the second electrode section, the serial current path being connected between the first and second terminals; and a second resistor one end of which is connected to the first terminal via a conductive bottom plate, the second resistor being connected to the movable contact via the movable plate and the intermediate fixing plate and being connected in parallel to the serial current path, wherein the first resistor is arranged in a manner such that a longer direction extends in a direction orthogonal to a direction in which electricity flows through the movable plate, the first resistor is connected in a manner such that two ends of the longer direction form a bridge between the first and second electrode sections, and the first resistor is arranged in a manner such that an intermediate portion of the longer direction is inserted into a gap formed between the second resistor and an inside position with respect to a portion at which the movable contact of the movable plate is formed.

2. The motor protector according to claim 1, wherein the first resistor is formed of a thin metallic-material plate having a high specific resistance in comparison with the first and second terminals, copper, and iron.

3. The motor protector according to claim 1, wherein the second resistor is a PTC (positive temperature coefficient) element and is configured in a manner such that one half or greater of an upper electrode surface is in direct contact with the intermediate fixing plate, such that a gap in which a central portion of the first resistor is inserted is formed between atop surface of a remaining portion and an inside position with respect to the portion at which the movable contact of the movable plate is formed, and such that a lower electrode surface is connected to the conductive bottom plate.

4. The motor protector according to claim 1, wherein the movable plate includes a long hole formed at a central portion along the longer direction, pegs formed at the two ends of a shorter direction, and hooks formed at the two ends of the longer direction of the long hole, the first resistor faces the bimetallic element via the long hole of the movable plate, two longer-direction ends of the bimetallic element loosely engage with the hooks of the movable plate, the positions of two shorter-direction ends of the bimetallic element are controlled by the pegs of the movable plate so as to be held by the movable plate, at a predetermined temperature or lower, the bimetallic element is held by the movable plate in a shape that is similar to a shape of the movable plate that causes the movable contact to contact with the fixed contact, and at temperatures higher than the predetermined temperature, a warpage in the longer direction is reversed to lift the end of the movable plate (9) at which the movable contact (8) is provided, thereby separating the movable contact and the fixed contact from each other.

5. The motor protector according to claim 1, wherein the conductive bottom plate and the intermediate fixing plate forming the current path are formed of a ferromagnetic substance.

6. The motor protector according to claim 1, wherein the motor protector is attached by a member that does not form the current path so as to surround an upper position and a side-surface position of the movable contact (8), and the member is formed of a ferromagnetic substance.

* * * * *